United States Patent [19]

Dowding et al.

[11] 4,373,188
[45] Feb. 8, 1983

[54] CIGARETTE WEIGHT MONITORING SYSTEM

[75] Inventors: John G. Dowding; Peter R. Turner, both of London; Robert J. Hudson, Pootings, Nr. Edenbridge, all of England

[73] Assignee: Molins Limited, London, England

[21] Appl. No.: 82,902

[22] Filed: Oct. 9, 1979

[30] Foreign Application Priority Data

Oct. 7, 1978 [GB] United Kingdom ............... 39720/78

[51] Int. Cl.$^3$ ........................ G06G 7/48; G01B 13/02
[52] U.S. Cl. .................................... 364/552; 131/910; 340/347 NT; 364/554; 364/567; 364/812
[58] Field of Search ............... 364/552, 567, 568, 554, 364/812, 605; 235/92 NT, 92 QC; 340/347 AD, 347 NT; 367/65–67; 131/21 R, 21 B, 22 R, 22 A

[56] References Cited

U.S. PATENT DOCUMENTS

| | | | |
|---|---|---|---|
| 3,259,746 | 7/1966 | Blunt | 235/92 QC |
| 3,390,354 | 6/1968 | Munch | 340/347 NT |
| 3,763,361 | 10/1973 | Smart | 364/552 |
| 3,816,721 | 6/1974 | Turner | 364/552 |
| 3,952,185 | 4/1976 | Stultz et al. | 131/22 R |
| 4,078,233 | 3/1978 | Frye | 340/347 AD |
| 4,103,535 | 8/1978 | Mutter et al. | 131/21 R |
| 4,144,578 | 3/1979 | Mueller et al. | 364/812 |

OTHER PUBLICATIONS

Sherlock, G., "Soft Centres for the Weight Watchers"; *Systems International;* vol. 5, No. 3; Apr. 1977, pp. 26–28.

*Primary Examiner*—Errol A. Krass
*Attorney, Agent, or Firm*—Craig & Antonelli

[57] ABSTRACT

Cigarette-rod weight monitoring system in which the signals from a scanner, e.g. a nucleonic device such as Molins "MODIC", are processed and stored in a memory in a digitized form, and the memory contents are used to drive an analog display device. These signals, which represent the individual cigarettes, or short lengths, are accumulated in the memory over a period which is sufficiently long for a statistically significant distribution pattern to be achieved, so that the shape of the distribution curve can be observed to determine whether it is "normal" or whether any skews or other irregularities are present. In addition the accumulated signals can be analyzed in various ways to provide quantitative measurements of overall standard deviation, or effective standard deviation either side of the mean to show whether any "skews" exist. S.D. can be calculated for whole cigarettes or short lengths for different diagnostic purposes.

8 Claims, 5 Drawing Figures

CIGARETTE WEIGHT MONITORING SYSTEM

This invention relates to the inspection of cigarettes in order to determine the quality of production, and in particular the weight and/or distribution of tobacco in cigarettes produced in large quantities on modern cigarette making machines, and the deviation of the cigarettes from the intended weight. The invention is particularly applicable to systems in which the weight of the rod issuing from the cigarette making machine is monitored continuously before the cut-off, and in which synchronizing pulses representing the position of the cut are generated so that the weight control system can identify the monitored weight with each cigarette, group of cigarettes, or short length of cigarette. One example of such a system is the Molins MODIC beta-ray measuring system and MAID weight signal analysis system.

Apparatus according to a first aspect of the invention, for providing a graphic display of the distribution of weights of cigarettes about a desired mean, comprises analog-to-digital converter means for converting a series of analog weight signals for successive cigarettes or cigarette lengths to digital signals; means for allocating each digitized signal to a memory location in accordance with its relationship to the desired mean; means for periodically scanning the memory to determine the number of cigarettes assigned to each location; and means for successively supplying signals representing each location and the number of cigarettes assigned to it, to a graphic display device.

In a preferred embodiment of the invention, the apparatus comprises an integrating analog-to-digital converter for the incoming signals; a microprocessor having a memory; a digital to analog converter for supplying a signal representing the contents of each location to a display device, and a further digital to analog converter for supplying a signal representing the respective number of cigarettes to the display device.

Preferably the display device is a cathode-ray-oscilloscope and the signals are supplied respectively to the X-axis and the Y-axis of the display. Alternatively the display device may be a solid-state device such as a matrix of photodiodes or the like.

Preferably the input signal for the apparatus is supplied from a rod-weight monitoring system such as the Molins MODIC which provides a continuous output comprising a voltage proportional to the weight of a small section of the rod. According to a further aspect of the invention, a method of processing a continuous analog signal from a cigarette rod weight control system so as to facilitate analysis of weight variations comprises the steps of generating a first signal comprising a reference ramp signal for each successive time interval corresponding to a length of rod whose weight variation is to be analyzed; generating a second signal by integrating the weight signal over each time interval; applying one of the first or second signals to the input of a variable gain amplifier and continuously comparing the output of the variable gain amplifier, in a comparator, with the other of the said signals; and generating a gain control signal for the variable gain amplifier in accordance with the output of the comparator circuit in such a way as to match the output of the variable gain amplifier with the said other signal. The gain control signal at the end of any selected time interval will then be indicative of the actual weight of the corresponding section of rod.

Preferably the first signal, i.e. the reference ramp signal, is applied to the variable gain amplifier.

In a preferred arrangement in which the distribution of the weight of cigarettes about a desired mean is to be displayed graphically, in accordance with the first aspect of the invention, the gain of the variable gain amplifier is varied by the steps of: applying the difference signal from the comparator circuit to an up-down counter so that the counter counts in one direction when the difference is positive, and the other direction when it is negative; and applying the digital output of the updown counter to a "binary variable resistor" in the feedback loop of the variable gain amplifier. The "binary variable resistor" comprises a chain of attenuating elements which are switched into or out of the circuit in accordance with the digital signals applied to it. Such a device is commonly known as a analog-to-digital, or digital-to-analog, converter, depending upon its mode of use. Thus in the preferred arrangement of the invention, the reference ramp (analog) signal is applied to the input of the variable gain amplifier circuit, and the feedback control (digital) signal is applied to the converter in the feedback loop. As a result of the comparison of the integrated weight signal and the amplified ramp signal, the digital feedback control signal assumes a value representative of the actual weight of the corresponding section of rod over the selected time interval, and thus the whole circuit operates as a analog-to-digital converter for the rod-weight signal, which automatically provides an integrated weight signal over any selected time interval. Because of the comparison with the reference ramp signal, the weight signal is always "scaled" suitably for the selected time interval automatically, i.e. the same digital output will be provided for a 10 mm (for example) length of rod which is of the correct weight, as for any other length of the correct weight.

One embodiment of the invention will now be described by way of example with reference to the accompanying drawings, in which.

Figure 1:
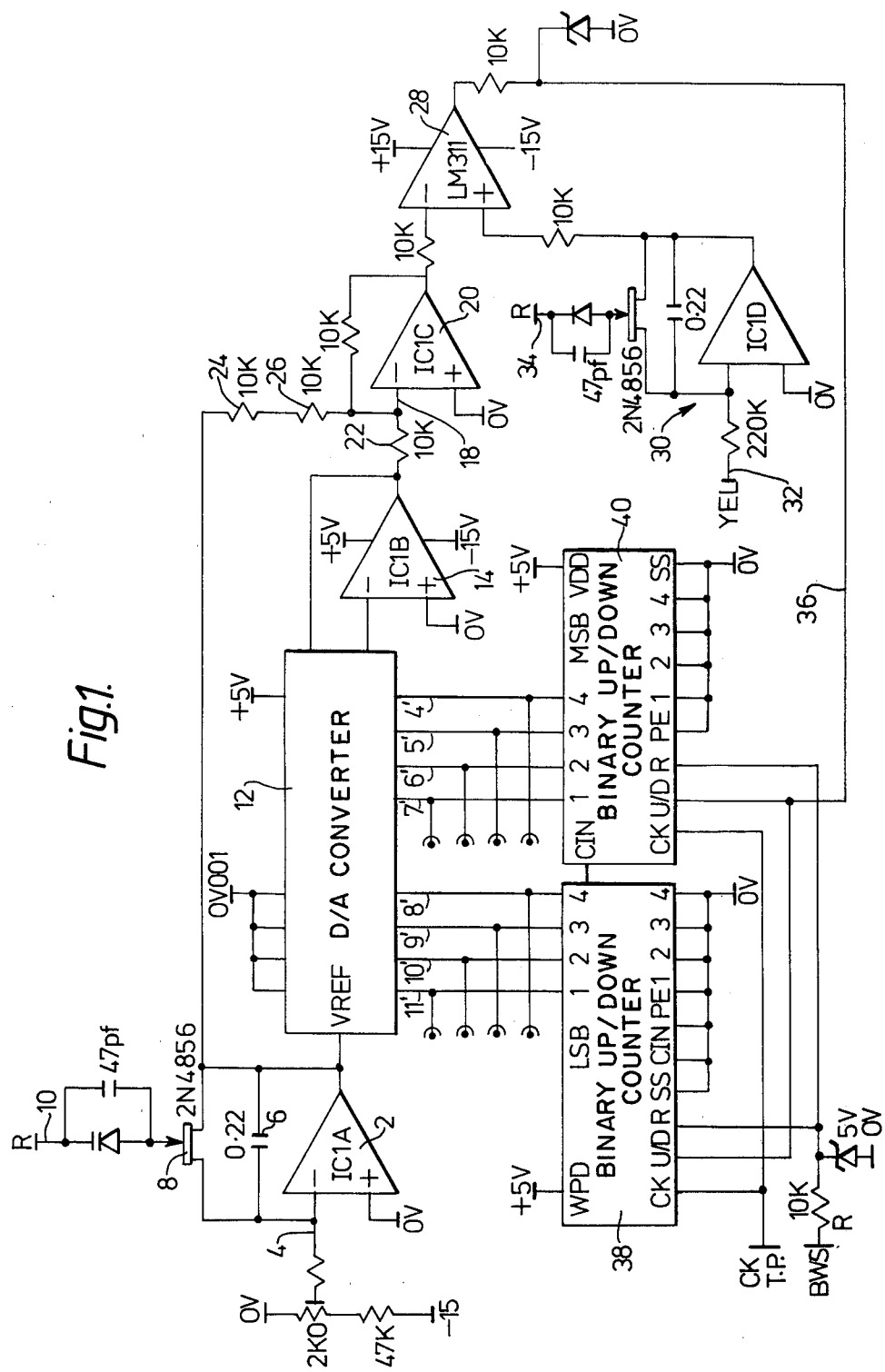
FIG. 1 is a circuit diagram of an analog-to-digital converter and scale factor correction circuit for processing a rod-weight signal.

Referring first to FIG. 1, an operational amplifier 2 is supplied with a preset reference voltage at its inverting input 4. An 0.22 uF capacitor 6 is connected between the input and output of the amplifier so that it acts as an integrator and a FET 8 is connected in parallel with the capacitor, so that the appearance of a negative-going reset pulse at terminal 10, which is connected to the gate of the FET, causes the integrator output to be reset to the input reference voltage. The pulse which is supplied to terminal 10 is normally the "end of cigarette pulse" or "ECP" which is generated by the cigarette making machine; respectively, if integration over shorter lengths is required the pulses may be applied more frequently.

The ramp signal from amplifier 2 is applied to the "multiplying reference input" of a digital-to-analog converter circuit 12. This circuit works in conjunction with an amplifier 14, in the following way: the input voltage is applied to the amplifier 14 via the converter 12 which contains a "binary variable resistor" network which is connected into the feed-back loop of the amplifier. The amount of feed-back is set by applying an eight-digit binary number to pins 4' to 11' of the converter; the binary number is derived in a manner which will be explained below.

The output of amplifier 14, which is thus made equal to the instantaneous value of the ramp signal, multiplied by a certain factor "K" is applied to the input 18 of a further amplifier 20 via resistor 22. A fixed proportion of the actual ramp signal is also applied to the input 18 via resistor chain 24, 26 whose total value is twice that of resistor 22 (20KΩ as against 10KΩ in this example).

The gain of this amplifier is fixed by a 10KΩ feedback resistor and its output is applied to the inverting input of a comparator 28.

The non-inverting input of the comparator 28 is fed with an integrated signal from a circuit 30 which operates in exactly the same way as the ramp-generating circuit 2-4-6-8-10 (see above) except that its input 32 is supplied with the analog voltage output of a cigarette rod-weight monitoring device, such as a beta-ray gauge. Thus, its output at any instant represents the integrated value of the rod-weight signal over the time period which has elapsed since the last resetting pulse was applied to its reset terminal 34.

The output of the comparator 28 is applied via line 36 to the "up-down count" terminals of an eight-digit binary counter 38, 40, whose output lines provide the binary number input for pins 4 to 11 of the A-D converter 12. The operative effect of the arrangement is as follows: when a reset pulse is applied to terminals 10 and 34 (and also to inputs R of the up-down counter 38, 40) the output voltage of the ramp generator begins to rise, and the counter output is then at zero so that the feedback applied to amplifier 14 via line 16 will be very large. Thus, the output applied to the inverting input of the comparator 28 will be very small. At the same time the output of the rod-weight signal integrating circuit 30, applied to the non-inverting input of comparator 28, will also be increasing and will be larger than the attenuated signal at the inverting input, so that a large positive signal will be applied to the U/D input of the up-down counter causing it to count up. As it counts up it reduces the feedback factor applied to the ramp signal circuit via converter 12, until the voltages at the two inputs of the comparator are equal, and the input to the ramp signal generating circuit is preset to such a level that this will occur when the rod-weight is "on-target" at the desired weight, and the counter 38, 40 is exactly half-full (i.e. contents 128). Of course if the input to the inverting input of the comparator 28 becomes larger than the integrated rod-weight signal the counter will simply count down again until they match.

Thus, the circuit provides an eight-digit binary signal, at pins 4'–11' and D-A converter 12 which quantitatively represents the integrated rod-weight signal.

Figure 2:
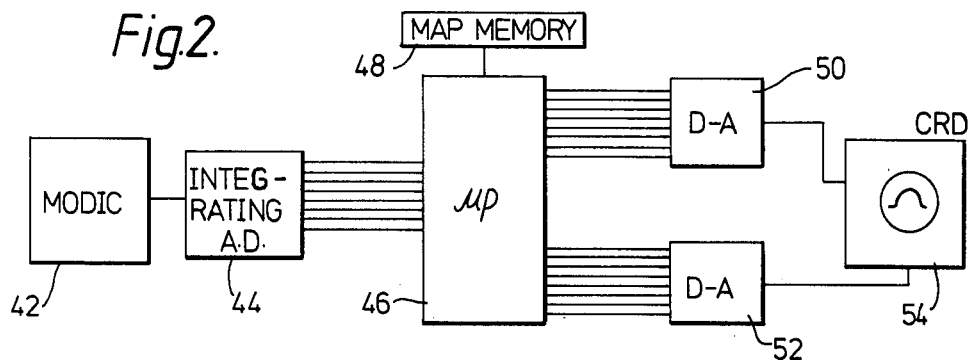
FIG. 2 is a block diagram of an apparatus for displaying the distribution of a signal produced by the circuit of FIG. 1.

FIG. 2 shows the overall layout of a display system for a rod-weight monitoring device 42. The weight signal is applied to an integrating A-D converter circuit 44 of the kind shown in FIG. 1, whose eight-bit binary output for each "end-of-cigarette" pulse is supplied to the data inputs of a microprocessor 46. This is arranged to store the output signal in an 8×256 bit memory 48, in a memory location which is appropriate in each case to the weight measured. Thus, for this purpose the memory may be considered as a graph having 256 possible locations along the "X-axis", each of which is capable of storing 256 "bits" representing a weight signal, measured along the "Y-axis". The location nearest the "origin" of the graph, location "1" receives the weight signals of the lightest cigarettes (e.g. 10% below target weight); similarly weight signals which equal the target weight are allocated to location "128", "halfway along" the X-axis; and weight signals of the heaviest cigarettes (e.g. 10% above the target weight) are allocated to location "256".

Figure 5:
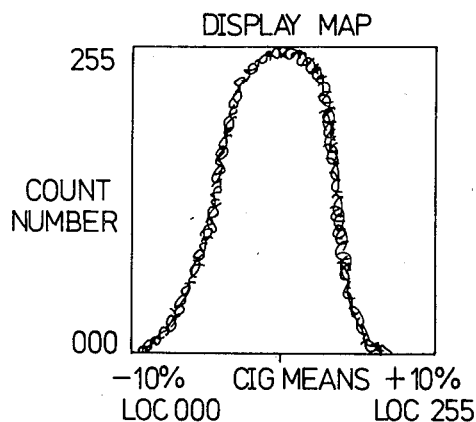
FIG. 5 is a typical display produced by the apparatus of FIG. 2.

The microprocessor is also arranged to repeatedly scan the memory and provide output signals, via respective digital-to-analog converters 50 and 52, to the X and Y inputs of a cathode-ray-oscilloscope 54. Thus for each memory location in turn a voltage is applied to the X-input representing the position of the location along the "X-axis" of the memory, and a voltage is applied to the Y-input which is proportional to the number of weight signals allocated to that location. Thus the output pattern will be displayed as a histogram of the type shown in FIG. 5.

Figure 4:
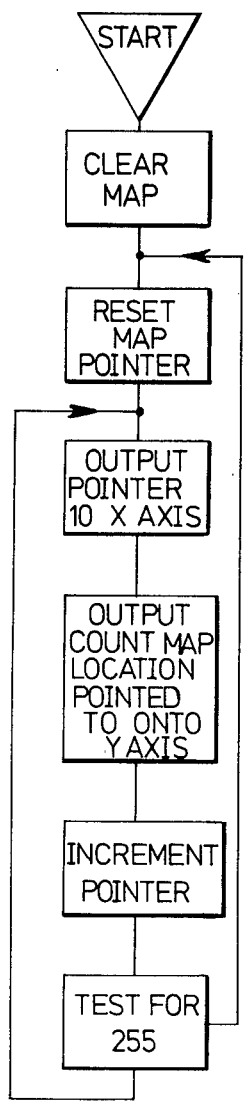
FIG. 4 is a flowchart of program steps for displaying the stored signals.
Figure 3:
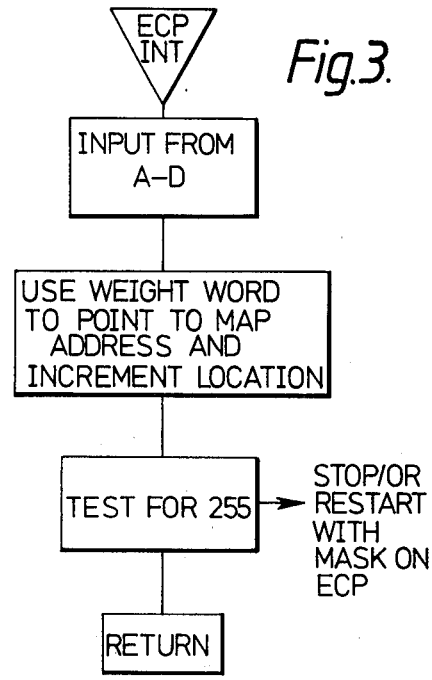
FIG. 3 is a flowchart of program steps for storing the signals produced by the circuit of FIG. 1.

The program steps involved in carrying out these functions are illustrated by the flowcharts shown in FIGS. 3 and 4. FIG. 3 shows how the memory is incremented. Each time an "end cigarette pulse (ECP)" is received by the microprocessor, it accepts the input of a binary word representing the integrated weight of a length of rod and increments the appropriate location in the memory. It then checks the contents of the location to see whether it contains less than 256 "bits" and if it does, the program returns to the point where it will accept another weight signal. If the contents of the location have reached 256 bits, i.e. it is full, the program is arranged to stop, or to clear the memory and restart and await the next ECP.

At the same time the information is being continuously fed to the CRO by means of the program illustrated in the flowchart of FIG. 4. This program proceeds at a fixed rate which is not dependent upon the occurrence of an ECP. When the apparatus is first started up, it clears the memory "map". Information is then fed to the memory as described above with reference to FIG. 3. The program then refers to the first location on the "X-axis" and applies a corresponding signal to the X-input of the CRO. It measures the contents of the location and applies this figure to the Y-input; it then moves onto the next location and tests the position of the location to see if it is the 256th location along the X-axis. If not, it again applies a corresponding signal to the Y-input of the CRO and so on. If however the location now addressed turns out to be the 256th location on the X-axis, it returns to the first location and repeats the process again.

In addition to merely plotting a map of the distribution of weights as shown, the apparatus may be arranged to calculate the mean weight and standard deviation from the information stored in memory. By suitable programming it will be appreciated that this can be done for whole cigarettes or short lengths, and for various numbers of cigarettes or lengths.

In addition to (or instead of) calculations of overall standard deviation, the apparatus may be arranged to calculate the effective standard deviation for each side of the mean separately, and will indicate whether they differ by more than a predetermined amount. This will show whether the distribution is truly "normal" or whether there is a skew towards "light" or "heavy" cigarettes. Such information can provide useful "diagnostic" information about the performance of the cigarette maker; for example if the distribution is skewed towards the "light" side there may be an inadequate supply of tobacco from the hopper, and if it is towards the "heavy" side there may be an "overfeed" of tobacco or the trimmer brush may not be working properly. Such analyses may of course be carried out for short lengths (e.g. 10 mm) of cigarette rod for a few cigarettes—e.g. 3½ cigarettes—to facilitate the diagnosis of faults causing short term variations, or at the opposite extreme, for whole cigarettes for 2000 cigarettes (for example), to enable faults causing long-term variations to be detected.

We claim:

1. Apparatus for providing a graphic display of the distribution of weights of cigarettes produced by a continuous rod cigarette making machine, about a desired mean valve, comprising analog-to-digital converter means for converting a series of analog weight signals for successive cigarettes or cigarette lengths to digital signals; a memory including a plurality of storage locations; means for allocating a binary bit corresponding to each weight signal, to a memory location in accordance with the digitized value of said signal; means for periodically scanning the memory to determine the number of bits assigned to each location; and means for successively supplying signals representing each location and the number of bits assigned to it, to a graphic display device.

2. Apparatus according to claim 1 in which the display device includes a cathode-ray-tube.

3. Apparatus according to claim 1 in which the display device includes a matrix of solid-state devices.

4. Apparatus for monitoring the weight of cigarettes including graphic display apparatus according to claim 1, and also including a nucleonic scanner for producing the said analog weight signal representing the cigarette rod weight.

5. A method of processing a continuous analog signal from a cigarette rod weight control system so as to facilitate analysis of weight variations, comprising the steps of generating a first signal comprising a reference ramp signal for each successive time interval corresponding to a length of rod whose variation is to be analyzed; generating a second signal by integrating the weight signal over each time interval; applying one of the first or second signals to the input of variable gain amplifier means and continuously comparing the output of the variable gain amplifier means in a comparator, with the other of the said first or second signals; and generating a gain control signal for the variable gain amplifier in accordance with the output of the comparator circuit in such a way as to match the output of the variable gain amplifier with the said other signal; so that the gain control signal at the end of the selected time interval is indicative of the weight of the corresponding section of rod.

6. A method of processing a continuous analog signal according to claim 5, to enable said signal to be displayed graphically, in which the gain of the said variable-gain amplifier is varied by the steps of: applying the difference output from the comparator circuit to an up-down counter so that the counter counts in one direction when the difference is positive, and in the other direction when it is negative; and applying the digital output of the up-down counter to the digital input of a digital-to-analog converter connected in a feedback loop of the variable-gain amplifier means, in such a way that the said digital input controls the degree of feedback and thereby acts to vary the gain.

7. Apparatus for processing a continuous analog signal to provide a series of digital outputs corresponding to the integrated value of said analog signal over successive time intervals, comprising: ramp signal generator means for generating a ramp signal corresponding in length to each said time interval; integrator means for generating an integrated weight signal for each time interval; a variable gain amplifier whose input is connected to receive one of said generated signals; comparator means for continuously comparing the output of said variable gain amplifier with the other of said generated signals; and means for generating a digital gain control signal for said variable gain amplifier, in accordance with the output of said comparator, so as to match the output of the variable gain amplifier to said other of said generated signals; whereby the gain control signal at the end of each successive time interval is indicative of the digital equivalent of said integrated value.

8. Apparatus as claimed in claim 7 in which said means for generating the digital gain control signal comprises an up-down counter whose up-down control input is connected to the output of said comparator so as to count in one direction if the comparator output is positive, and in the opposite direction if said output is negative; and an digital-to-analog converter connected in a feedback loop of said variable gain amplifier means, and having a digital input connected to said up-down counter, whereby the feedback of said amplifier means is set in accordance with the contents of said up-down counter.

* * * * *